(12) United States Patent
Sundaram et al.

(10) Patent No.: US 8,560,635 B1
(45) Date of Patent: Oct. 15, 2013

(54) USER EXPERIENCE OF CONTENT RENDERING WITH TIME BUDGETS

(75) Inventors: Sridhar Sundaram, Bangalore (IN); Ram Ramani, Bangalore (IN); Richard Rabbat, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 13/076,373

(22) Filed: Mar. 30, 2011

(51) Int. Cl.
*G06F 15/16* (2006.01)

(52) U.S. Cl.
USPC ............ 709/217; 709/203; 709/219; 709/223

(58) Field of Classification Search
USPC .................................. 709/203, 217, 219, 223
See application file for complete search history.

(56) References Cited

U.S. PATENT DOCUMENTS

| | | | |
|---|---|---|---|
| 6,011,537 | A | 1/2000 | Slotznick |
| 6,154,771 | A | 11/2000 | Rangan et al. |
| 6,157,933 | A | 12/2000 | Celi et al. |
| 6,356,288 | B1 | 3/2002 | Freeman et al. |
| 6,938,211 | B1 | 8/2005 | Chang et al. |
| 7,784,076 | B2 * | 8/2010 | Demircin et al. ............... 725/81 |
| 7,996,545 | B2 * | 8/2011 | Vogl et al. ...................... 709/229 |
| 2003/0110501 | A1 | 6/2003 | Rafey et al. |
| 2006/0112168 | A1 * | 5/2006 | Albers et al. .................. 709/213 |
| 2009/0070251 | A1 * | 3/2009 | Gonen et al. ..................... 705/37 |
| 2009/0119598 | A1 | 5/2009 | Oztaskent |
| 2009/0177532 | A1 * | 7/2009 | Brown et al. .................... 705/10 |
| 2009/0177959 | A1 | 7/2009 | Chakrabarti et al. |
| 2009/0249188 | A1 | 10/2009 | Dube et al. |
| 2010/0057939 | A1 | 3/2010 | Zhang et al. |
| 2010/0211690 | A1 * | 8/2010 | Pakzad et al. .................. 709/231 |
| 2011/0035277 | A1 * | 2/2011 | Kodialam et al. ........... 705/14.46 |

OTHER PUBLICATIONS

Yahoo! Inc., "Best Practices for Speeding up Your Website", 2010, available at http://developer.yahoo.com/performance/rules.html (last visited Dec. 23, 2010).
WWW.TECHNICAL-ASSIST.CO.UK,"Fine Tuning Firefox", 2010, available at http://www.technical-assistance.co.uk/kb/ffconfig.php (last visited Dec. 23, 2010).
S. Yegulalp, "Hacking Firefox: The secrets of about:config", Computerworld, May 29, 2007, available at http://www.computerworld.com/s/article/9020880/Hacking_Firefox_The_secrets_of_about_config (last visited Dec. 23, 2010).
Opera Software ASA, "Opera's Settings File Explained", 2010, available at http://www.opera.com/support/usingopera/operaini/ (last visited Dec. 23, 2010).
Aaron Hopkins, "Optimizing Page Load Time", Oct. 28, 2006, available at http://www.die.net/musings/page_load_time/ (last visited Dec. 23, 2010).

(Continued)

*Primary Examiner* — Phuoc Nguyen
(74) *Attorney, Agent, or Firm* — McDonnell Boehnen Hulbert & Berghoff LLP

(57) ABSTRACT

A budgeted time for displaying content at a client device is determined. The budgeted time is based on time-budget values. The content can be delivered and displayed in one or more phases. The time-budget values correspond to the one or more phases. Transmission of given content is requested. At least one component of the given content is received. The received at least one component of the given content is displayed within the budgeted time after requesting the transmission of the given content.

25 Claims, 9 Drawing Sheets

(56) References Cited

OTHER PUBLICATIONS

Webcredible, "Ten Ways to Speed Up the Download Time of Your Web Pages", Nov. 2004, available at http://www.webcredible.co.uk/user-friendly-resources/web-usability/speed-up-download-time.shtml (last visited Dec. 23, 2010).

Advameg Inc. "What is Progressive JPEG?", Jul. 29, 2010, available at http://www.faqs.org/faqs/jpeg-faq/part1/section-11.html (last visited Dec. 23, 2010).

S. Sundaram et al., U.S. Appl. No. 13/076,349, filed Mar. 30, 2011.

* cited by examiner

USER EXPERIENCE OF CONTENT RENDERING WITH TIME BUDGETS

BACKGROUND

Unless otherwise indicated herein, the materials described in this section are not prior art to the claims in this application and are not admitted to be prior art by inclusion in this section.

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data. Typically, "best effort" techniques are used in communicating the content over the Internet; that is, no guarantees are provided that data is delivered or that a quality of service is assured while communicating the content. In best effort delivery, an entity receiving content typically adapts to the network's timing for delivering content by waiting for the content.

SUMMARY

In one embodiment, a method for displaying content in phases is provided. A budgeted time for displaying content on a client device is determined. The budgeted time is based on time-budget values. The content is delivered and displayed in one or more content-display phases. The time-budget values correspond to the one or more phases. Transmission of given content to the client device is requested. One or more components of the given content are received at the client device. The received one or more components of the given content are displayed using the client device within the budgeted time after requesting the transmission of the given content.

In another aspect of the disclosure of the application, a system for displaying content in phases is provided. The system includes one or more processors. The one or more processors are at least configured to: (a) determine a budgeted time for displaying content based on time-budget values, where the content is delivered and displayed in one or more phases, and where the time-budget values correspond to the one or more phases, (b) request transmission of given content, (c) receive at least one component of the given content, and (d) display the received one or more components of the given content within the budgeted time after requesting the transmission of the given content.

In yet another aspect of the disclosure of the application, an article of manufacture including a tangible non-transitory computer-readable storage medium having computer-readable instructions encoded thereon is provided. The computer-readable instructions include: (a) instructions for determining a budgeted time for displaying content based on time-budget values, where content is delivered and displayed in one or more content-display phases, and where the time-budget values correspond to the one or more phases, (b) instructions for requesting transmission of given content, (c) instructions for receiving one or more components of the given content, and (d) instructions for displaying the received one or more components of the given content within the budgeted time after requesting the transmission of the given content.

In still another aspect of the disclosure of the application, a system for displaying content in phases is provided. The system includes: (a) means for determining a budgeted time budget based on time-budget values, where content is delivered and displayed in one or more content-display phases, and where the time-budget values correspond to the one or more phases, and (b) means for requesting transmission of given content, (c) means for receiving one or more components of the given content, and (d) means for displaying the received one or more components of the given content within the budgeted time.

DETAILED DESCRIPTION

Figure 1:
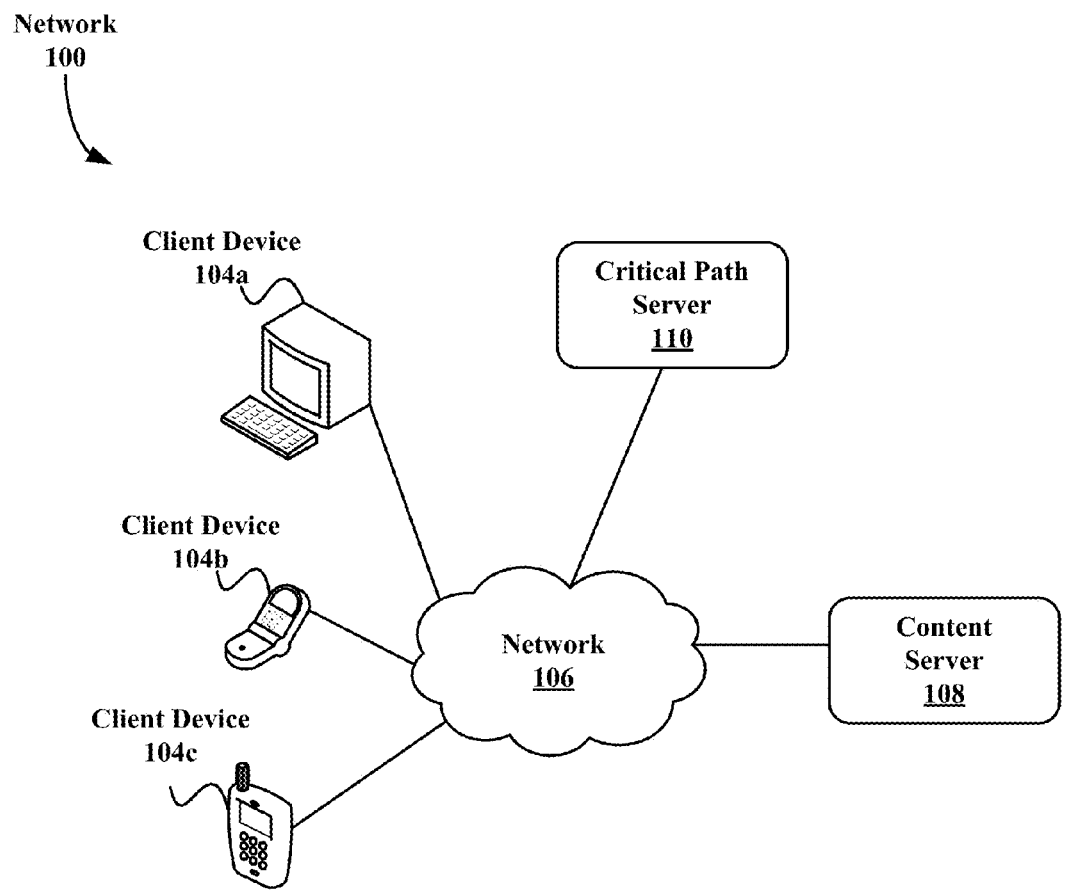
FIG. 1 depicts a network in accordance with an example embodiment.

The following detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Techniques are described herein for communicating content based on a time budget for the content. For example, content such as a web page can have text, images, video, audio, and/or other types of components. The time budget can be specified as one or more amounts of time related to delivering content. For example, the time budget can include one or more time-budget entries. Each time-budget entry can provide one or more time-budget values, or amount(s) of time for one or more phases for delivering content from one or more servers, such as the critical-path server and/or a content server, to a requesting device and displaying content using the requesting device. For example, time-budget entries can specify amounts of time for a requesting content phase, an initial server response phase, a content downloading phase, and a display or rendering phase. Then, the requesting device can use the time-budget entries to determine an amount of time for performing each phase of content delivery. In this context, the sum or other combination of the times specified in the time-budget entries can constitute a budgeted time for delivering and for displaying content.

As another example, the time budget can be specified using time-budget values with one or more times by which content is to be delivered or displayed. For example, the time budget can specify that content is to be delivered and displayed by a fixed time, such as 2 PM. Specifying time budgets in terms of a time for delivery or display can permit prioritization among many types of content; e.g., content to be delivered by 2 PM can have a higher priority than content delivered by 2:15 PM.

The content can be analyzed using content rules to determine one or more components of the content. For example, content such as a web page can have text, images, video, audio, and/or other types of components.

Most content, such as web pages, has one or more critical components that are fundamental to the reviewing the content. That is, experience of the content is incomplete without the critical components being delivered. Other non-critical components add value by enhancing the user experience. As an analogy, components of an automobile that can be considered as critical could be wheels, a motor to drive the wheels, and controls, such as a steering wheel and brakes. Other components, such as upholstery, body contours, hub caps, and other accoutrements, may be important but could be considered as non-critical.

A critical-path ordering of content components can permit critical components to be delivered while the non-critical parts are in process of delivery to a requesting device, such as a client device. To that end, critical-path data can indicate that some components can have higher (or lower) value than other components, and thus should have correspondingly higher (or lower) priority in the critical-path ordering. Using critical-path ordering to deliver content takes advantage of the observation that user perceptions are coarse-grained and highly parallelized and that machine capabilities are fine-grained and sequential.

User experience of content display can be improved by splitting the content into components and delivering higher-priority components before lower-priority components. Even as the higher-priority components are being displayed, the lower-priority components can be transmitted over the network and replaced in the displayed content. In some cases, the lower-priority content can seamlessly replace the higher-priority content. The collection of critical-path ordering techniques described herein can provide delivery of content within the desired time budget most of the time, even if the content is delivered using one or more best-effort networks (e.g., the Internet).

A critical-path server can determine the critical-path ordering for requested content by analyzing the requested content according to device information, the critical-path data, and/or the content rules. The critical-path ordering can be used to prioritize transmission of the components of the requested content from the critical-path server to the requesting client device. The most important, i.e., highest-priority in the critical-path ordering, components may be transmitted first, while less important or lower-priority components may be transmitted after the most-important components.

As another example, the critical-path data can include information about a time budget, including one or more time-budget entries as discussed above. Then, the critical-path server and a client device can use the time-budget entries to determine an amount of time for performing each phase of content delivery. In this context, the sum or other combination of the times specified in the time-budget entries can constitute a budgeted time for delivering and displaying content.

The times specified in the time-budget entries, can be specified directly or implicitly by the critical-path server and/or the requesting device. The time-budget entries may be based on request intervals for requesting information and/or by ratings of delivered content. For example, suppose a user of a requesting device requests content C at time T1 and then re-requests C at time T1+2.2 seconds. The request interval, or time between requests of content C, can be determined by subtracting the times for requesting C or T1+2.2 seconds−T1=2.2 seconds. As another example, suppose content C1 was delivered with time(s) specified by time-budget entry/entries and then C1 was rated by a user as being "incomplete." In response to the incomplete rating, times in one or more time-budget entries can be increased to increase the likelihood that C1 will be completely displayed in the future. Continuing the rating example, suppose content C2 was delivered and rated by a user as being "complete." In response to the complete rating, times in one or more time-budget entries can be maintained, or perhaps decreased, to increase the likelihood that C2 will be displayed in the same or less time in the future. By use of critical-path data including time-budget entries, the client device can specify and thereby control the amount of time required to display content requested from the critical-path server.

Giving an entity, such as user or other computing device, implicit or explicit control over content-delivery timing can enhance the user experience. By using time budgets, the network supplying content to the entity adapts to the time budget to deliver content. In contrast, in best effort delivery, the entity often adapts by waiting to the network's timing for delivering content.

As another example, the critical-path ordering can take account of processor speeds of the client device, such as the speeds of central processing units (CPUs), graphics processing units (GPUs), and/or other processors driving content display on client device. For example, a first client device with one CPU operating with a clock speed of n gigahertz (GHz) and without a GPU is likely to take considerably longer to display content than a second client device with a quad-core CPU, each core operating at at least 2 n GHz, and with a GPU.

Correspondingly, the critical-path server can determine that more content can be displayed on the second client device in a fixed time budget than on the first client device, and adjust the critical-path ordering accordingly. As one example, a priority of image content can be reduced.

As another example, for some component types, compressed or sub-sampled versions can be transmitted, perhaps to be replaced by later, uncompressed or fully-sampled versions of these components. For example, suppose the requested content included a 1024×1024 pixel image Image that had a high priority in the critical-path ordering and that the Image was ten times larger than any other component of the content. As content delivery time would be dominated by the Image, the critical-path server could determine that the Image can be replaced with a first, smaller compressed and/or sub-sampled image corresponding to the Image as a high-priority component. One or more higher-quality components corresponding to the Image could be later sent as lower-priority components to replace the earlier-transmitted components. Thus, the critical path server can provide a progressively higher quality display of the Image.

In some cases, the Image could be transmitted using interlacing or progressive encoding, such as using the interlacing techniques available for images encoded using Graphics Interchange Format (GIF), Portable Network Graphics (PNG), Joint Photographic Experts Group (JPEG), Progressive Graphics File (PGF), and/or other file formats supporting interlacing or progressive encoding. In these cases, the Image can be displayed using corresponding interlacing or progressive display techniques.

As content is delivered to the client device, the critical-path ordering can account for other properties of the client device. For example, devices capable of displaying content can have a predetermined display area. If the predetermined display area is smaller than a display size of content, a critical-path ordering can prioritize visible components of content over components that are not visible in the predetermined display area.

For example, suppose rendered content were to have a display size of 1000×1000 pixels, but a requesting client device has a display with a size of 400×400 pixels. Then, the components of the rendered content visible in the 400×400 screen can have a higher priority in a critical-path ordering than the not-visible components. In this example, the critical-path server can delay sending of not-visible components, and correspondingly speed the display of actually visible content. Various other properties of the client device can be accounted for as well.

The critical-path server can use connection information, or information about one or more networks connecting the client device and the critical-path server, to determine the critical-path ordering. The connection information can include but is not limited to bandwidth information, round-trip delay information, upload speeds, download speeds, and/or maximum number of connections. As one example, download speeds and/or bandwidth information can be used to estimate a maximum amount of data that can be transmitted to the client device in a predetermined amount of time. As another example, suppose a client device supports multiple simultaneous connections. Then, in some cases, a separate critical path ordering per connection can be determined and the multiple critical path orderings can be used to transmit content simultaneously. Other connection information and uses of connection information for determining critical-path orderings are possible as well.

Critical-path data and/or content rules can include data about preferences for content display and/or transmission. For example, an entity can set content-priority preferences in critical-path data to prioritize time-sensitive information over images, while another entity can use content-priority preferences to prioritize image delivery over textual data. Continuing the example of web page content, a web page could include text with time-sensitive information (e.g., stock quotes, sports scores, news feeds), text without time-sensitive information (e.g., articles, book excerpts, etc.), images, and audio information. In some embodiments, the content-priority preferences are determined by analyzing the content, perhaps by scanning for tags, meta-data, or other information within the content to determine content-priority preferences. In other embodiments, the critical path server can use content rules to determine content-priority preferences.

Components can be adapted to fit the device information, the critical-path data, the connection information, and/or the content rules. In particular, the time budget can cause the critical-path server to adapt one or more components of delivered content. The component adaptation is driven by the budgeted time available and a best estimate of what can be done within the budgeted time. In some cases, functionality can be reduced in light of a time budget. For example, content providing e-mail access can revert to permitting only read and write access to e-mail while disabling search functionality due to time budgets.

In some embodiments, time budgets and critical-path orderings can be utilized separately. For example, let there be a time budget of T seconds for delivering content, which can be specified by an associated client device. The time budget for content can be satisfied by a server using any technique available to the server for delivering content to the associated client device, as long as the requested content is delivered within T seconds. Also, in some embodiments, critical-path orderings can be used without time budgets. For example, a critical-path server can determine a critical-path ordering for content without consideration of a budgeted time required for delivering the content.

In other embodiments, time budgets and critical-path orderings can be utilized together. If a time budget of T seconds has been specified, perhaps via one or more time-budget entries, the critical-path server can utilize the time budget as an input for generating the critical-path ordering. For example, for relatively small values of T, the critical-path ordering can involve utilizing sub-sampled, compressed, or otherwise smaller, yet at least partially equivalent, versions of content to increase the number of components that can be delivered within the time budget of T seconds. As another example, the content server can determine that the components in the critical-path ordering are to be delivered utilizing more bandwidth (e.g., the content is delivered over faster and/or larger numbers of connections) when T is relatively small than when T is relatively large, thus permitting the same amount of content to be delivered with a relatively smaller time budget.

Turning to the figures, FIG. 1 depicts a network 100 in accordance with an example embodiment. In FIG. 1, content server 108 and critical-path server 110 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Content server 108 can provide content to client device 104a-104c and/or critical-path server 110. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

Critical-path server 110 can be configured to generate and utilize critical-path orderings to deliver requested content. Alternatively, content server 108 and critical-path server 110 can be implemented on one computing device, be co-located, and/or be accessible via a network separate from the network 106. Although FIG. 1 only shows three client devices, content server 108 and/or critical-path server 110 can serve hundreds, thousands, or even more client devices.

Computing Device and Computing Network Architectures

Figure 2A:
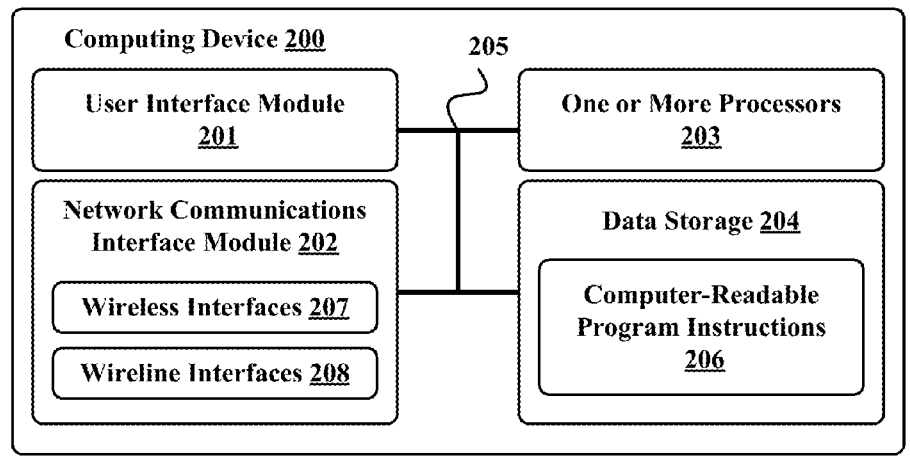
FIG. 2A is a block diagram of a computing device in accordance with an example embodiment.

FIG. 2A is a block diagram of a computing device 200 in accordance with an example embodiment. Computing device 200 can be configured to perform one or more functions of client devices 104a, 104b, and 104c, content server 108, and/or critical-path server 110. The computing device 200 can include a user interface module 201, a network-communication interface module 202, one or more processors 203, and data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some embodiments, the data storage 204 can be implemented using a single physical device (e.g., one optical, magnetic, organic or other memory or disc storage unit), while in other embodiments, the data storage 204 can be implemented using two or more physical devices.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some embodiments, the data storage 204 can additionally include storage required to perform at least part of the herein-described techniques, methods (e.g., method 700), and/or at least part of the functionality of the herein-described devices and networks.

Figure 2B:
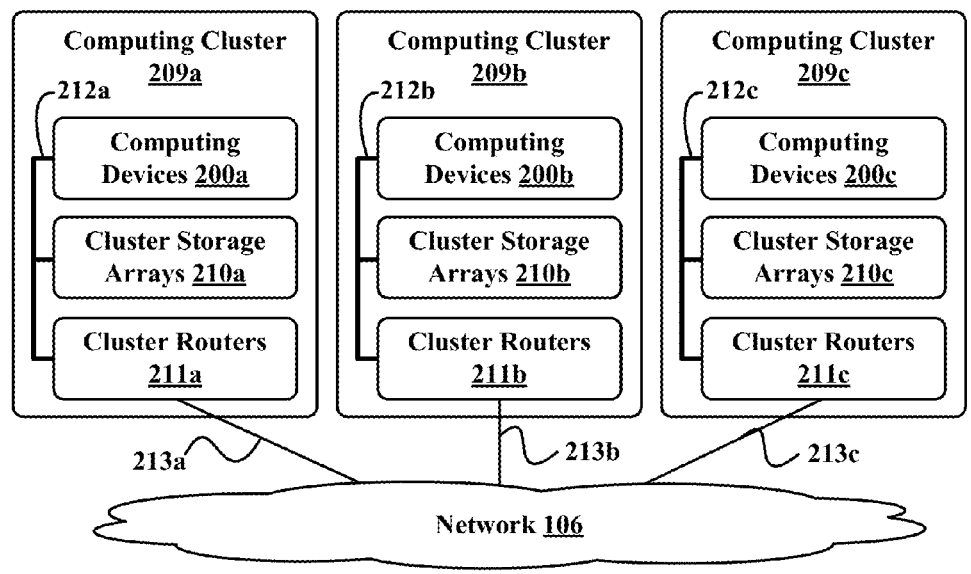
FIG. 2B depicts a network with computing clusters in accordance with an example embodiment.

FIG. 2B depicts a network 106 with computing clusters 209a, 209b, and 209c in accordance with an example embodiment. In FIG. 2B, functions of content server 108 and/or critical-path server 110 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some embodiments, each of computing clusters 209a, 209b, and 209c can have an equal number of computing devices, an equal number of cluster storage arrays, and an equal number of cluster routers. In other embodiments, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of content server 108. In one embodiment, the various functionalities of content server 108 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with critical-path server 110. Computing devices 200b and 200c in computing clusters 209b and 209c can be configured the same or similarly to the computing devices 200a in computing cluster 209a.

On the other hand, in some embodiments, computing devices 200a, 200b, and 200c each can be configured to perform different functions. For example, computing devices 200a and 200b can be configured to perform one or more functions of content server 108, and the computing devices 200c can be configured to perform one or more functions of critical-path server 110.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of content server 108 and/or critical-path server 110 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for content server 108, while other cluster storage arrays can store data for critical-path server 110. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some embodiments, computing tasks and stored data associated with content server 108 and/or critical-path server 110 can be distributed across the computing devices 200a, 200b, and 200c using a variety of techniques. These techniques for distributing tasks and stored data can be based at least in part on the processing requirements for functions of content server 108 and/or critical-path server 110, the processing capabilities of the computing devices 200a, 200b, and 200c, the latency of the local cluster networks 212a, 212b, and 212c, the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Time Budgets for Content Delivery

Figure 3:
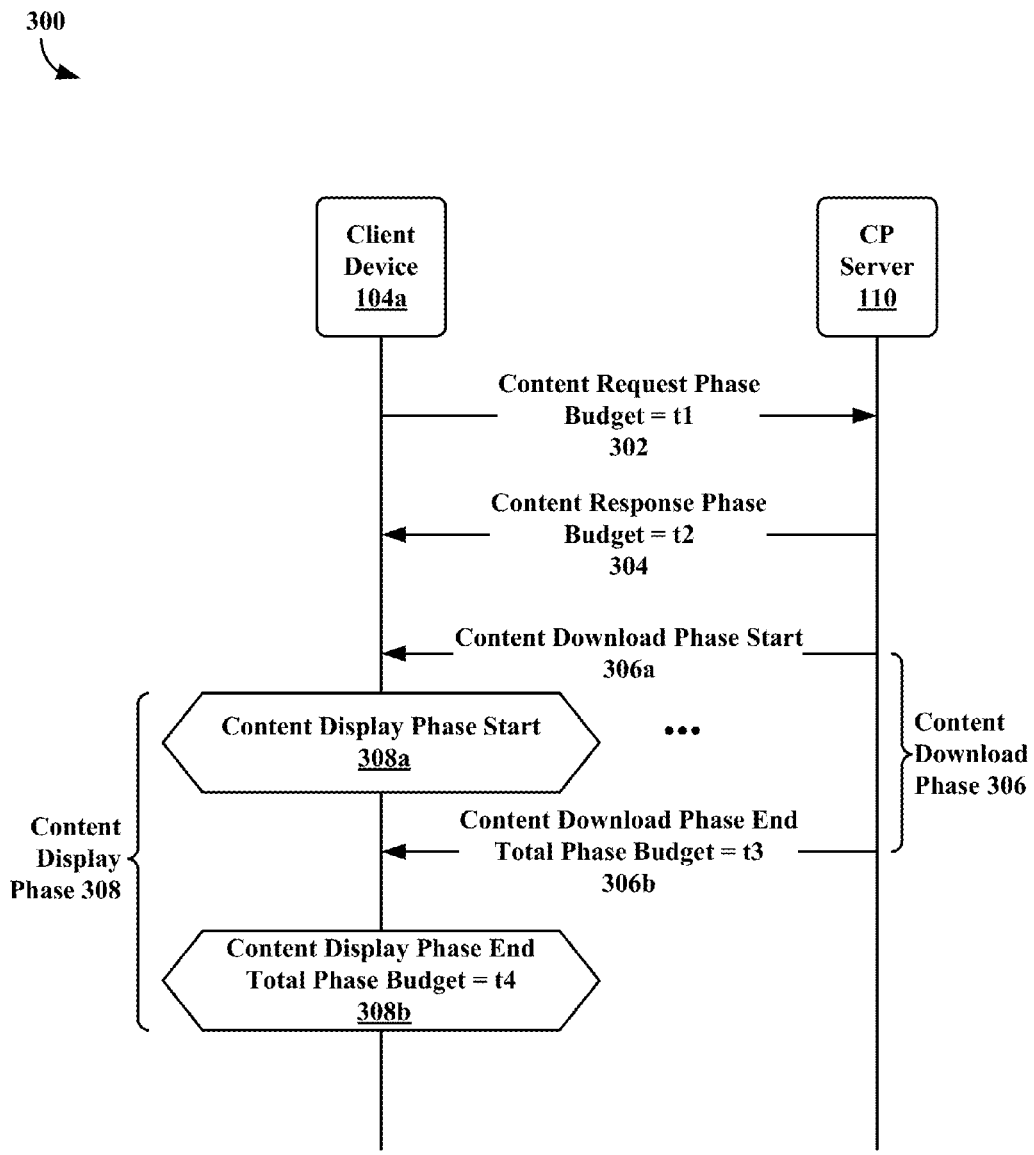
FIG. 3 is a ladder diagram in accordance with an example embodiment.

FIG. 3 is a ladder diagram 300 in accordance with an example embodiment. Ladder diagram 300 depicts an example set of phases for content delivery between client device 104a and critical-path (CP) server 110. In other scenarios not shown in FIG. 3, other client devices other than 104a could be used, while in still other scenarios, more, fewer, and/or different phases for content delivery between a client device and a critical path server could be utilized.

During content request phase 302, client device 104a can request content from critical-path server 110. Content request phase 302 can include processing of content requests according to one or more content-delivery-related protocols, such as but not limited to HyperText Transfer Protocol (HTTP), Structured Stream Transport (SST), the Speedy (SPDY) Protocol, the MUX protocol, or the SMUX protocol. FIG. 3 also indicates that a time budget of t1 can be allocated for content request phase 302.

During content response phase 304, critical-path server 110 can respond to the content request sent during content request phase 302 with a content response. As with the content request, content response phase 340 can include processing of content requests in accord with one or more content-delivery-related protocols, such as but not limited to HTTP, SST, SPDY, MUX, or SMUX. FIG. 3 indicates that a time budget of t2 is allocated for content request phase 304. In some scenarios not shown in FIG. 3, the content response of content response phase 304 can include some or all of the content requested during content request phase 302.

After responding to the content request, critical-path server 110 can begin to download (i.e., send) the requested content to client device 104a during content download phase 306. FIG. 3 shows that content download phase 306 can begin at content download phase start 306a and can end at content download phase end 306b. FIG. 3 also indicates that a time budget of t3 can be allocated for content download phase 306.

After at least some content is downloaded to client device 104a, the downloaded content can be displayed during content display phase 308. FIG. 3 shows that content display phase 308 can begin at content display phase start 308a and can end at content display phase end 308b. FIG. 3 also indicates that a time budget of t4 can be allocated for content download phase 308.

While some phases take place serially, some of the phases in the example set of phases for content delivery can take place in parallel. For example, FIG. 3 shows that content display phase 308 overlaps content download phase 306 and so these two phases can occur in parallel. During the parallel portion of content display phase 308 and content download phase 306, content can be simultaneously downloaded to client device 104a and displayed by client device 104a.

A budgeted time can be determined based on the time budgets for the phases for content delivery. For example, the budgeted time can be the sum of the time budgets for all phases for content delivery. Using the example shown in FIG. 3, the corresponding budgeted time can be t1+t2+t3+t4. In other scenarios, a single budgeted time value can be used for the entire content delivery (i.e., content delivery could have a single phase), some of the phase time budgets could be omitted from the calculation leading to the budgeted time, adjustments could be made for parallel phases (e.g., subtract a portion or all of the time allocated to a phase that occurs in parallel for other phases), time for delays can be added or subtracted, and/or some or all of the phase budgets can be scaled by one or more scaling factors. Many other techniques for determining a budgeted time for content delivery based on time-budget entries for content delivery phases are possible as well.

The budgeted time can be implicitly specified. For example, time budgets can be implicitly specified using request intervals, or intervals between making content requests. Suppose an entity makes a first content request at time ReqTime1 and later makes a second content request at time ReqTime2. The request interval RI for these two content requests can be determined by the formula R1=ReqTime2−ReqTime1.

A time budget can be specified based on a minimum, an average, and/or a maximum request interval time. For example, a time budget can be specified in terms of a minimum or maximum request interval time, such as a request interval of no less than 1 second or a request interval of no more than 3500 ms. As another example, a time budget can be specified in terms of an average request interval time, perhaps including minimum and/or maximum request interval times. Such example time budgets could include an example time budget specifying a minimum, average, or maximum request interval time of 3 seconds and an example time budget specifying minimum, average, and maximum request interval times with an average request interval time of 3 seconds±1 second.

In some cases, the implicitly-specified time budget can be used to further specify time budget entries for content delivery phases. Suppose an implicit time budget of ITB=2000 milliseconds (ms)=2 seconds has been specified. Table 1 above specifies, as an example, a percentage of the time budget used by the content request phase PER_CRP of 24%. Then, the implicitly-specified time budget value for the content request phase ITB_CRP can be determined by the formula ITB_CRP=PER_CPR*ITB=24%*2000 ms=480 ms.

Further, user ratings of content can implicitly specify a budgeted time. For example, suppose content was requested, but not completely displayed, within a specified budgeted time. A user rating of the displayed content as "unacceptable" or "not completely displayed" can indicate implicitly that the specified budgeted time should be increased. In contrast, if few or no "not completely displayed" ratings have been received for a predetermined number of content requests from a particular user or client device, then the implication could be that the budgeted time is too high, and thus could be decreased. Other techniques for implicitly specifying budgeted times and time budgets are possible as well.

The time budget can be explicitly specified utilizing one or more time-budget entries. User interfaces for time budgets and time-budget entries are discussed below in more detail in the context of FIG. 5. Each time-budget entry can specify one or more time-budget values, or amounts of time for a corresponding phase of content delivery. Table 1 below shows an example set of time-budget entries.

TABLE 1

| Phase | Time Budget Value | Percentage of Time Budget |
| --- | --- | --- |
| Content Request Phase | 240 ms | 24% |
| Content Response Phase | 160 ms | 16% |
| Content Download Phase | 200 ms | 20% |
| Content Display Phase | 400 ms | 40% |

Taking the sum of the example set of time-budget entries in Table 1, a budgeted time of 240+160+200+400=1000 ms for content delivery can be specified. In another example, a range of values can be specified for each content delivery phase (e.g., the content request phase ranges between 50 and 250 ms). In yet another example, a single time-budget value could specify a maximum duration for content delivery. Other content delivery phases and corresponding time-budget entries could be specified as well; e.g., an "above-the-fold" or visible display complete phase and corresponding time-budget value, an "interactivity allowed" phase and corresponding "time to interactivity" time-budget value. Other explicit specifications of time budgets, content-delivery phases, time-budget entries, budgeted times, and/or time-budget values are possible as well.

In some cases, one or more time-budget values can be provided to a component responsible for performing one or more phases of content delivery as a component-time budget. For example, a browser or other rendering component could receive time-budget values for displaying content. Using the time-budget values, the browser could determine appropriate priorities related to the content display phase, such as display time, display quality, displayable components, etc.

In other cases, the component could exceed a time budget by a small amount or percentage of time, such as when the small amount/percentage of time is used to provide a better quality of service. For example, suppose the rendering component had a time budget of 1000 ms and determined that content can be rendered at a highest quality within 1050 ms (5% of the original time budget). For this example, the small additional amount of time could be used to provide a higher quality rendering.

Similarly, a time budget specifying delivery at or before a given time can include a small amount or percentage of time to exceed the time budget. As an example, suppose content is budgeted to be delivered by 12:00:00 PM with a 5 second amount of permitted delay. Then, if the content were delivered at 12:00:03 PM, the content can be considered to be delivered within the time budget including the permitted delay. Many other examples of providing time-budget values to components and component use of time budget values are possible as well.

The decision to use additional amounts of time and/or the corresponding amounts of time can be specified in critical-path data, such as discussed below in the context of FIG. 5. For example, the critical-path data can include a parameter to decide whether to use or not to use additional amounts of time without specifying the amount. As another example, the critical-path data can specify amounts of additional times but leave the decision to use such additional amounts of time with the critical-path server. Many other examples of providing time-budget values to components and component use of time-budget values are possible as well.

Techniques for explicit and implicit specification of time budgets can be combined. For example, a time budget can be determined using the above-mentioned implicit-budgeting techniques and then tuned using explicit specification of time budgets for one or more phases of content delivery. As another example, explicitly-specified time budgets can be used to determine percentages of time budgets explicitly, such as via data entry, or implicitly. For example, the time-budget entries for all phases can be specified to get a time budget $TB_n$, then the implicit percentage $IP_i$ for phase $P_i$ ($0<=i<=n$) can be determined as $IP_i=P_i/TB_n*100\%$. Then, the percentages of time budgets can be used, as discussed above, to specify time-budget entries based an implicit time budget. Other combinations of explicit and implicit time budgets are possible as well.

Critical-Path Ordering of Content

Figure 4:
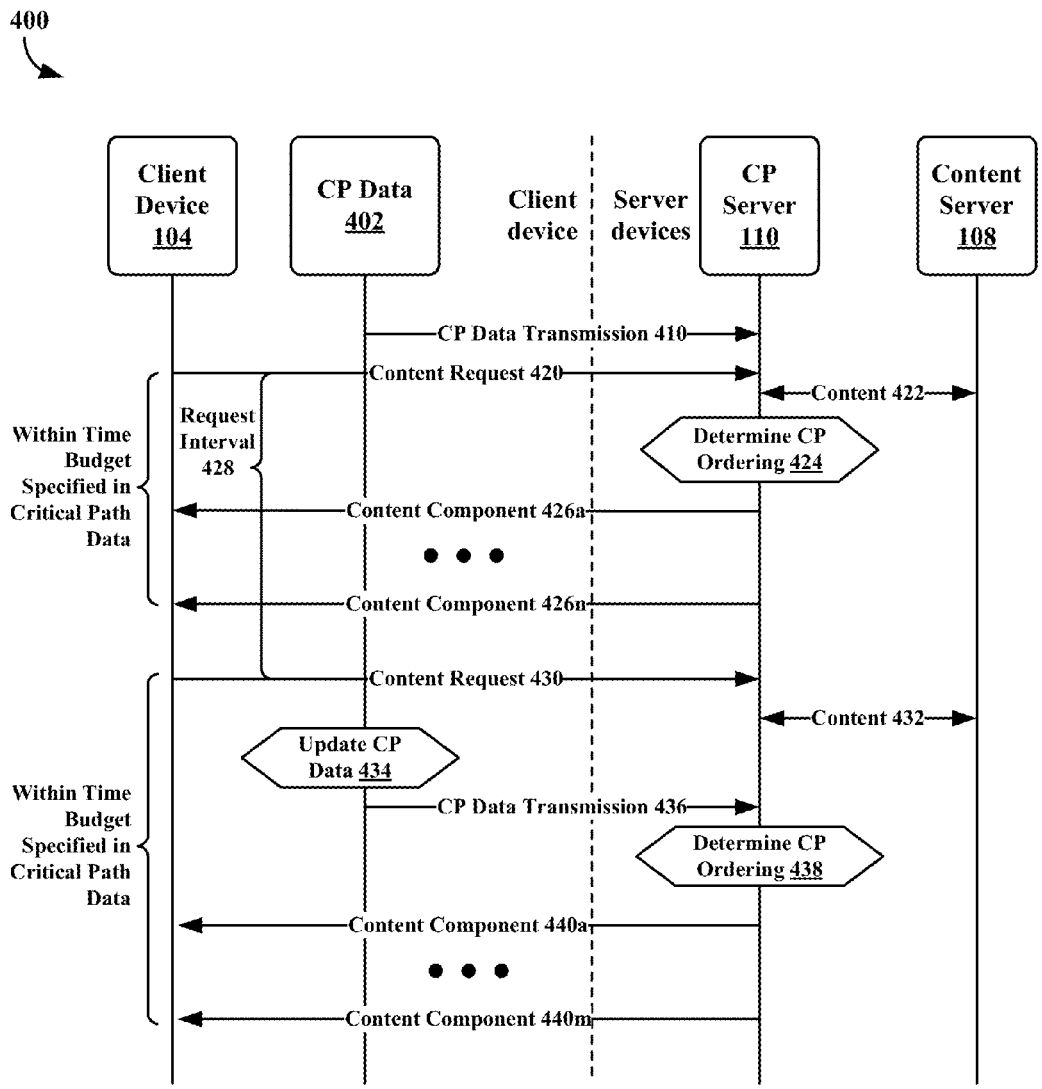
FIG. 4 is another ladder diagram in accordance with an example embodiment.

FIG. 4 is a ladder diagram 400 in accordance with an example embodiment. A transmission of critical data 402 is communicated from a client device 104 to critical-path server 110 via critical path (CP) transmission 410. Critical-path data is described below in more detail in the context of FIG. 5.

Client device 104 can communicate content request 420 to request content delivery via critical-path server 110. Upon reception of content request 420, critical-path server 110 can request content 422 from content server 108 as specified in content request 420. Content server 108 can deliver content 422 to critical-path server 110.

At block 424, upon reception of content 422, critical-path server 110 can determine a critical-path ordering 424 for content components 426a-426n of content 422. Using the critical-path ordering, critical-path server 108 can communicate content components 426a-426n to client device 104. As shown in FIG. 4, content components 426a-426n are delivered within a time budget specified in critical-path data 402 and communicated via critical-path data transmission 410.

After request interval of time 428, client device 104 sends another content request 430 to critical-path server 110. Upon reception of content request 430, critical-path server 110 can request content 432 from content server 108 as specified in content request 430. Content server 108 can deliver content 432 to critical-path server 110.

At block 434, client device 104 can implicitly update a time budget specified in critical-path data 402 based on request interval 428. Implicit specification of time budgets using request intervals is discussed above in more detail in the context of at least FIG. 3. Upon updating critical-path data 402, client device 104 can communicate updated critical-path data 402 to critical-path server 110 using critical-path data communication 436.

At block 438, upon reception of content 432 and updated critical-path data via critical-path data communication 436, critical-path server 110 can determine a critical path 438 for content components 440a-440m of content 432. Using the critical-path ordering, critical-path server 108 can communicate content components 440a-440m to client device 104. As shown in FIG. 4, content components 440a-440m are delivered within a time budget specified in critical-path data 402 and communicated via critical-path data transmissions 410 and 436.

Figure 5:
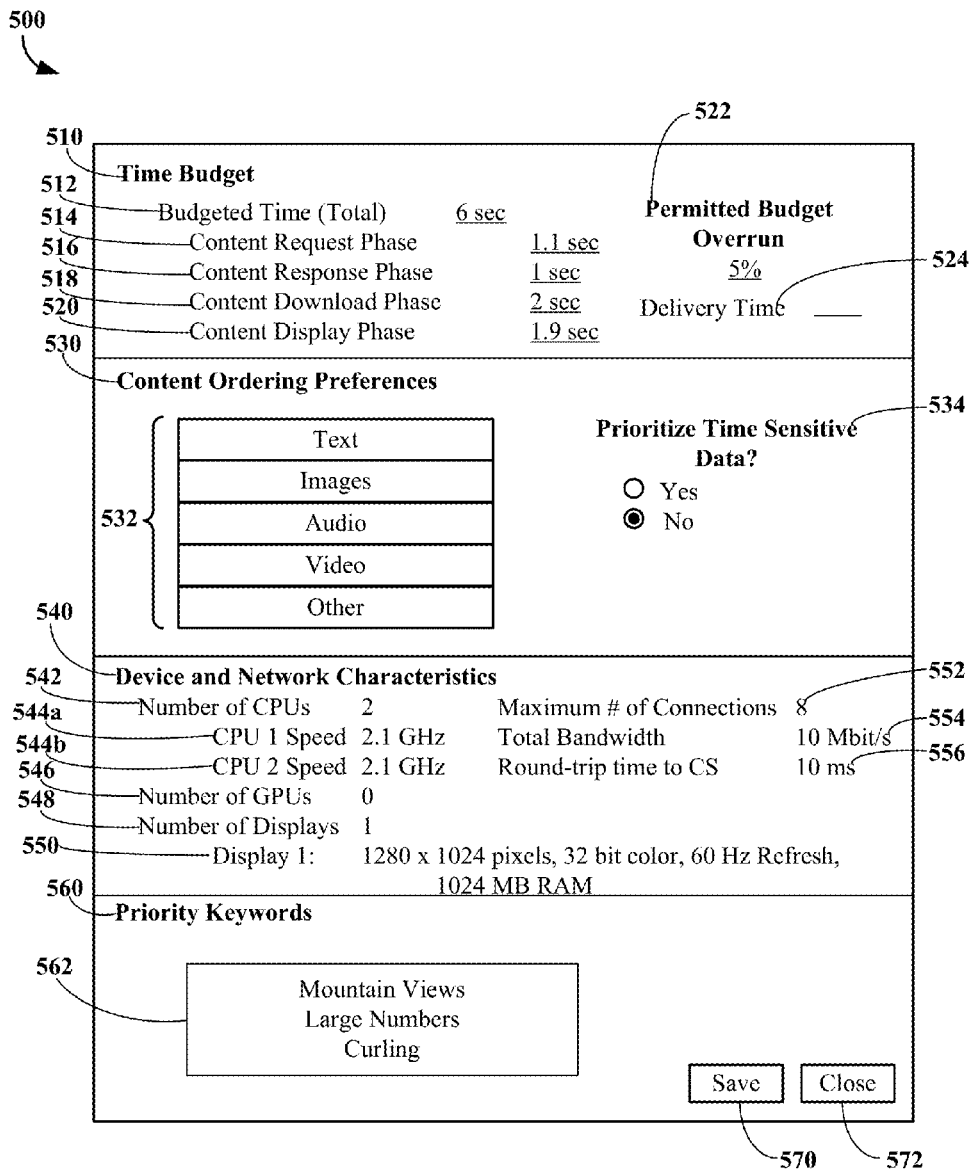
FIG. 5 depicts a user interface for critical-path data, device information, connection information, and content-priority preferences in accordance with an example embodiment.

FIG. 5 depicts a user interface 500 for critical-path data, device information, connection information, and content-priority preferences, in accordance with an example embodiment. In some embodiments, part or all of user interface 500 can be generated, operated, and/or displayed on a client device, such as client device 104a, 104b, or 104c. In other embodiments, part or all of user interface 500 can be generated, operated, and/or displayed on a server, such as content server 108 and/or critical path server 110. In still other embodiments, user interface 500 is generated, operated, and/or or displayed by a combination of both a client device and a server.

User interface 500 can display and/or change critical-path data, device information, connection information, and/or content-priority preferences. User interface 500 includes time budget interface 510, content ordering preferences interface 530, device and network characteristics interface 540, priority keywords interface 560, and control buttons 570 and 574.

Time budget interface 510 can display and/or change a budgeted time 512 and/or time budget entries for various phases of content display. For example, FIG. 5 shows time-budget entry for content request phase 514 of 1.1 sec, time-budget entry for content response phase 516 of 1 sec, time-budget entry for content download phase 518 of 2 sec, and time-budget entry for content display phase 520 of 1.9 sec, for budgeted time 512 as a total of the time-budget entries with a value of 6 sec. Other examples for budgeted times are possible as well.

Time budget interface 510 can be used to display and/or change permitted budget overrun 522. As shown in FIG. 5, permitted budget overrun 522 is 5%, which can be applied to each phase of content delivery and/or to the time-budget total. As examples, using some of the figures shown in FIG. 5, a content request phase can be permitted to have an overrun of 55 milliseconds (ms) (1.1 sec=1100 ms*5%=55 ms) for a total of 1155 ms, and the time-budget total can be permitted to have an overrun of 300 ms, for a total of 6300 ms.

Delivery time 524 can be used to specify a time budget in terms of a content delivery time. Delivery time 524 can be entered as an absolute time, e.g., 12:00:00 PM, or as a relative time, e.g., within 20 seconds. Permitted budget overrun 522 can be utilized when delivery time 524 is specified. For example, if delivery time 524 is specified as 2:00:00 PM and the current time is 1:58:00 PM, the total budgeted time for delivery would then be 2 minutes (120 seconds). The permitted budget overrun, can be applied to the total time for delivery. Continuing this example, using a 5% permitted budget overrun shown in FIG. 5, the permitted budget overrun is 120 seconds of total budgeted time*5%=6 seconds of permitted budget overrun.

Content ordering preferences interface 530 can include a priority interface 532 configured to display and/or change content-priority preferences for various types of content. As shown in FIG. 5, the priorities of content types go from text (highest priority) to other (lowest priority). In some embodiments, priority interface 532 permits changing of relative priorities using a drag-and-drop interface; for example, to move an audio content type to the highest priority, a box of priority interface 532 marked "audio" could be selected using a input interface (e.g., a mouse) and dragged on top of a box of priority interface 532 with the highest priority content type of "Text". After this example drag-and-drop operation, the content-type priorities can be: Audio, Text, Images, Video, and Other. Additional content ordering preferences interfaces and content types are possible as well.

Content ordering preferences interface 530 can include types of priority selections as well. As shown in FIG. 5, prioritize time sensitive data interface 534 can display and/or select that time-sensitive data is prioritized or not prioritized. Other priority selections are possible as well.

Device and network characteristics interface 540 can display and/or change device information and/or connection information for a device configured for displaying content (e.g., client devices 104a, 104b, or 104c). FIG. 5 shows device and network characteristics interface 540 displaying number of CPUs 542, number of GPUs 546, number of displays 548, maximum number of connections 552, total bandwidth 554, and round-trip time 556.

Number of CPUs 542 and Number of GPUs 546, respectively, can display a number of CPUs and a number of GPUs resident on the device configured for displaying content. In the example in FIG. 5, the device configured for displaying content has 2 CPUs, but does not have a GPU. FIG. 5 also shows each of the two CPUs with clock speeds 544a and 544b equal to 2.1 GHz.

Number of displays 548 can display a number of displays. Each display in the number of display can be used by the device to actually display content. In the example shown in FIG. 5, the device configured for displaying content has one display: Display 1. Display information 550 for Display 1 indicates that Display 1 can display 1280×1024 pixels using 32 bit color, has a refresh rate of 60 Hz, and includes 1024 megabytes (MB) of RAM. Additional information, perhaps for more or fewer displays, can be shown as display information as well.

Number of connections 552 can indicate a maximum number of network connections available to the device configured for displaying content. Total bandwidth 554 can indicate a maximum or total amount of bandwidth available to the device configured for displaying content. Round-trip time 556 can indicate a round-trip time to a content server (CS); that is, the time for data to go from the device configured for displaying content to the content server and back. In the example shown in FIG. 5, the device configured for displaying content has 8 connections available with a total bandwidth of 10 megabits per second (Mbit/s), and a round-trip time to the content server of 10 milliseconds. Additional network information can be changed and/or displayed as part of device and networks characteristics interface 540 as well.

Priority keywords interface 560 can be configured to display and/or change keywords 562. For example, when delivered content includes one or more of keywords 562, such as "Mountain Views", "Large Numbers", and/or "Curling" as shown in FIG. 5, then the component(s) containing these keywords can be prioritized over component(s) of content not containing any specified keywords. Other keywords and content-priority preferences can be specified.

One or more services, such as a critical-path server, can adapt delivery of content based on data displayed and/or changed via the time budget interface 510, content ordering preferences interface 530, device and network characteristics interface 540, and/or priority keywords interface 560, and/or other information described herein such as, but not limited to, content rules, content-priority preferences, connection information, and/or device information. In some embodiments, the service(s) can adapt by generating the critical-path ordering taking into account some or all of this information. Other adaptations are possible as well.

Save control button 570, which selected, instructs a device operating user interface 500 to save data entered using user interface 500. Close control button 572, when selected, instructs a device operating user interface 500 to close user interface 500. In some embodiments, any data changed using user interface 500 before selecting close control button 572 is not saved; while in other embodiments, upon selection of close control button 572, a dialog (not shown in FIG. 5) is displayed prompting a user to either save data changed using user interface 500 or to close user interface 500 without saving any data changed via user interface 500. In still other embodiments, more or fewer control buttons can be provided by user interface 500.

Example Communications

Figure 6A:
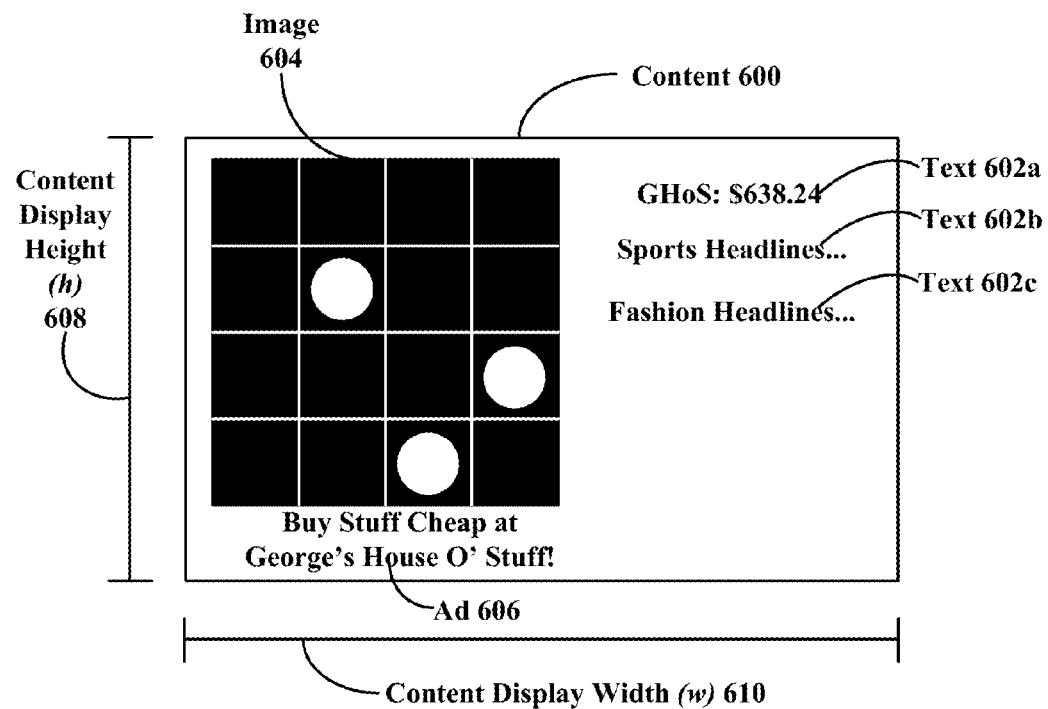
FIG. 6A illustrates example content in accordance with an example embodiment.

FIG. 6A illustrates example content 600 in accordance with an example embodiment. Example content 600 includes text 602a, 602b, and 602c, image 604, and advertisement (ad) 606. FIG. 6A shows that content 600 has content display height 608 of h and a content display width 610 of w.

Content 600 can be available from one or more content sources, such as content server 108. For example, ad 606 can be delivered from a different content source than text 602a-602c and/or image 604. Upon delivery, ad 606 can be aggregated with text 602a-602c and image 604 to form a display of content 600.

Based on an analysis of content 600 applying one or more content rules, critical-path server 110 can determine that content 600 has five components: text components corresponding to text 602a, 602b, 602c and ad 606, an image component corresponding to image 604. Critical-path server 110 can apply the one or more content rules on text components 602a, 602b, and 602c to determine that text component 602a includes time-sensitive data, text components 602b and 602c include non-time-sensitive data (text for links to additional sports and fashion information, respectively), and that ad 606 is an ad component. In some situations not shown in FIGS. 6A-6C, critical-path server 110 can treat ad 606 as a text component of content 600.

Many other examples of content available from one or more content sources are possible as well. These other examples of content may have more, fewer, or the same number of components, components may have same and/or different types, and/or may have different or the same content display heights and/or widths as content 600.

Figure 6B:
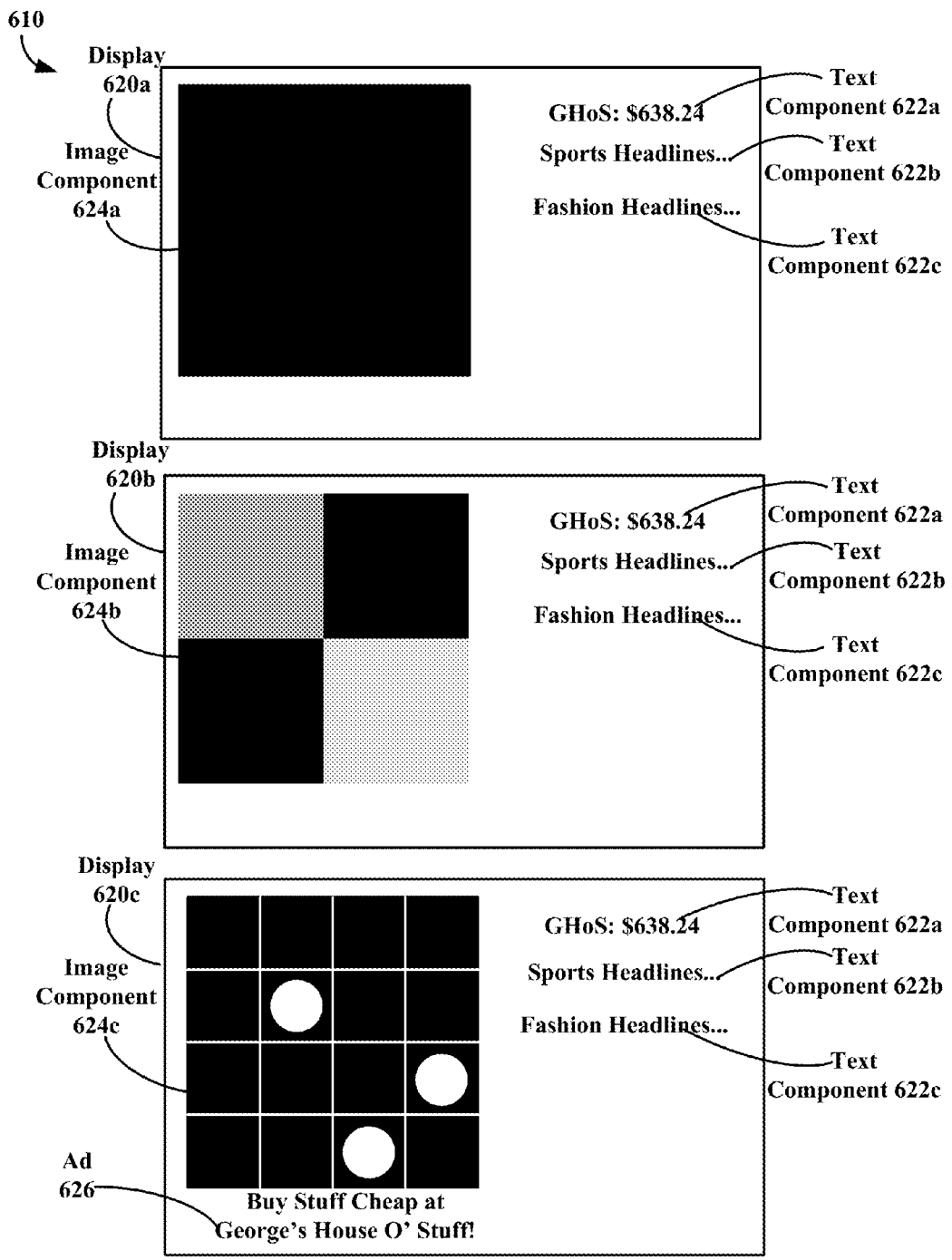
FIG. 6B shows a scenario for displaying content in accordance with an example embodiment.

FIG. 6B shows a scenario 610 for displaying content 600 in accordance with an example embodiment. In particular, scenario 610 begins after a content request has been made for content 600, and part of content 600 has been delivered to a client device (e.g., client device 104a, 104b, or 104c) for display. As such, scenario 610 can occur during content download phase 306 and content display phase 308 for displaying content 600.

In scenario 610, the critical-path data can include an indication that text components should have a higher priority than image components or ad components and an indication that time-sensitive text components should have a higher priority than non-time-sensitive text components. A critical-path ordering for scenario 610 can involve critical-path server 110 applying the indications in the example critical-path data to the five components of display 600. Then, critical-path server 110 can determine a critical-path ordering of the five components of content 600 with text 602a having a highest priority, text 602b and 602c having a next-highest priority, and image 604 and ad 606 having lower priorities than text 602b and 602c.

FIG. 6B shows display 620a with three text components 622a-622c and image component 624a for content 600. Text components 622a-622c include the time-sensitive text component 622a corresponding to text 602a of content 600, and the two non-time-sensitive text components 622b and 622 respectively corresponding to text 602b and 602c of content 600. Image component 624a can be a coarse version of image 604 of content 600. A coarse version of an image component can have some, but not all features of image 604. As shown in FIG. 6B, image component 624a only includes a background color of image 604.

Display 620a does not include a display corresponding to ad 606. That is, display 620a shows a partial display of the components of content 600. As discussed above, this partial display 620a of content 600 is in accordance with any critical-path data and corresponding critical-path ordering of content 600 for scenario 610.

FIG. 6B shows display 620b at a later point during the content download phase 306 and content display phase 308.

In particular, display 620b shows three text components 622a, 622b, and 622c, and a coarse version of image 604 as image component 624b. While both image components 624a and 624b are coarse versions of image 604, image component 624b is shown with more of the information content of image 604. For example, image component 624b can use interlaced or progressive display techniques to communicate and display of image 604. As discussed above, display 620b is in accordance with the critical-path data 502 and corresponding critical-path ordering 500 of content 600 for scenario 610.

FIG. 6B shows display 620c after content download and content display phases for delivering content 600 have completed. Display 620c shows complete versions of the five components of content 600 as text components 622a-622c, image component 624c, and ad 626. In particular, image component 624c is a complete (i.e., not coarse) version of image 604.

Figure 6C:
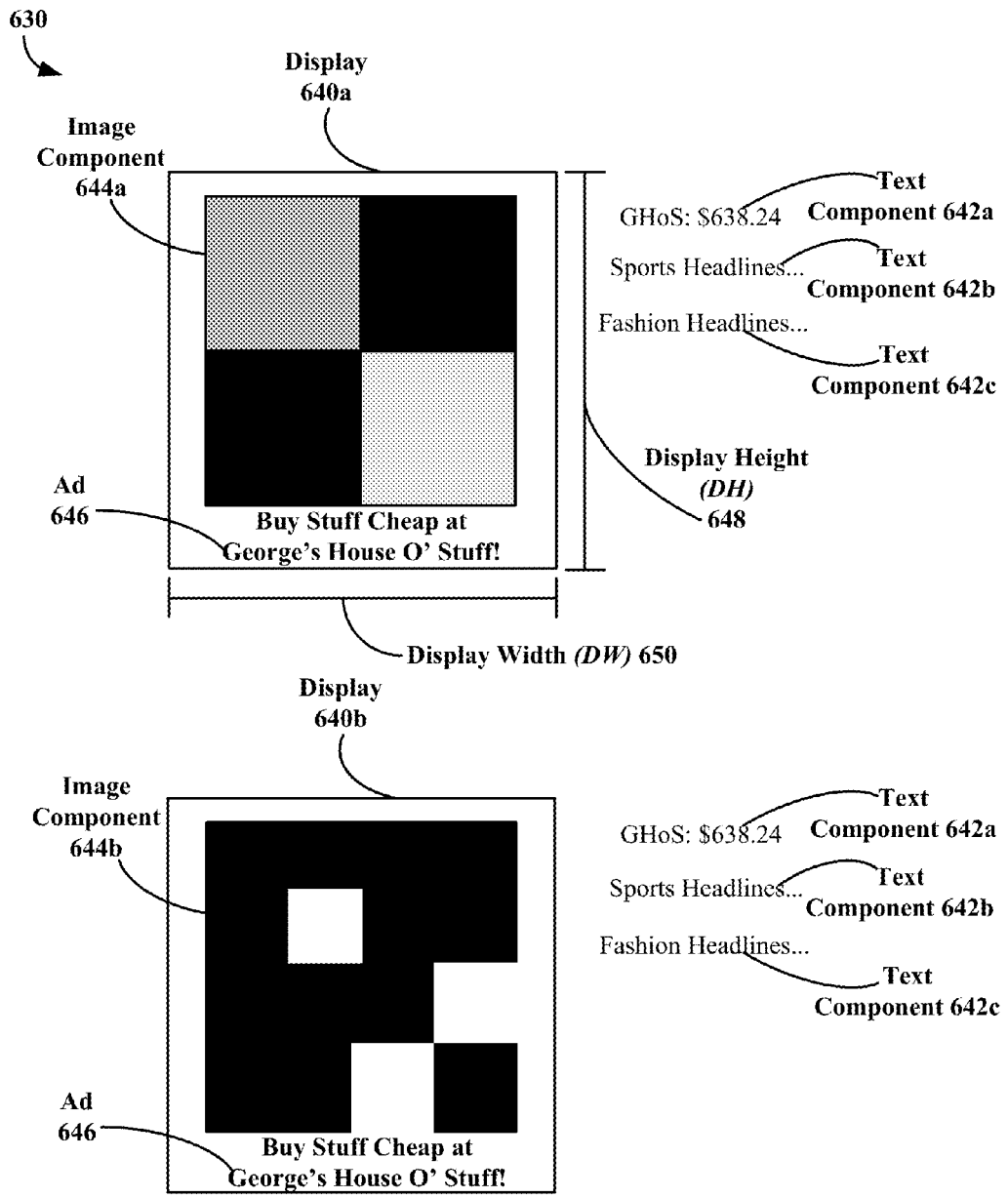
FIG. 6C shows another scenario for displaying content in accordance with an example embodiment.

FIG. 6C shows another scenario 630 for displaying content 600 in accordance with an example embodiment. In scenario 630, a budgeted time BT has been specified. Scenario 630 uses a device with a display height 648 of DH and a display width 650 of DW for displaying content 600. FIG. 6C shows that DH is equal to h (the content display height 608 for content 600), but DW is less than content display width 610 of w (the content display width 610 for content 600).

In scenario 630, device information 504 can include display height DH and display width DW to indicate a size of displaying content 600. Also for scenario 630, critical-path data 506 can include one or more time-budget entries specifying budgeted time BT. A critical-path ordering for scenario 630 can involve critical-path server 110 applying device information 504 and critical-path data 506 to the five components of display 600.

Critical-path server 110 can determine a critical-path ordering of the five components of content 600 with image 604 and ad 606 as having a higher priority as being visible components having a highest priority and with text components 642a-642c having correspondingly lower priorities. In scenario 630, ad 606 can have a smaller size than image 640. Then, determining a critical-path ordering in scenario 630 can involve using size and connection information to estimate that ad 606 is likely to take less time to display than image 604. In this example, the critical-path ordering can prioritize ad 606 over image 604.

As with scenario 610, scenario 630 begins after a content request has been made for content 600, and part of content 600 has been delivered to a client device (e.g., client device 104a, 104b, or 104c) for display. As such, scenario 630 can occur during content download phase 306 and content display phase 308 for displaying content 600.

FIG. 6C shows display 640a with ad 646 is bold text to indicate that ad 646 has been displayed. In contrast, three text components 642a-642c are shown in FIG. 6C in non-bolded text to indicate they are not displayed (and thus not visible) in display 640a.

FIG. 6C also shows image component 644a for content 600 as a coarse version of image 604. Critical-path server 110 can, in accordance with a critical-path ordering, defer communication of non-displayable text components 642a-642c until all visible components including image component 644a are communicated. That is, text components 642a-642c may not be communicated until a complete version of image component 644a is communicated and/or displayed.

FIG. 6C shows display 640b with ad 646 displayed and text components 642a-642c not displayed. Image component 644b is a further-refined but still coarse version of image 604. In scenario 630, the specified time-budget TB expired after rendering display 640; that is, an incomplete version of content 600 was communicated and displayed by a client device rendering displays 640a and 640b. Upon reviewing the incomplete version of content 600, display 640b can be rated as "not completely displayed", perhaps to implicitly increase budgeted time BT.

Example Operation

Figure 7:
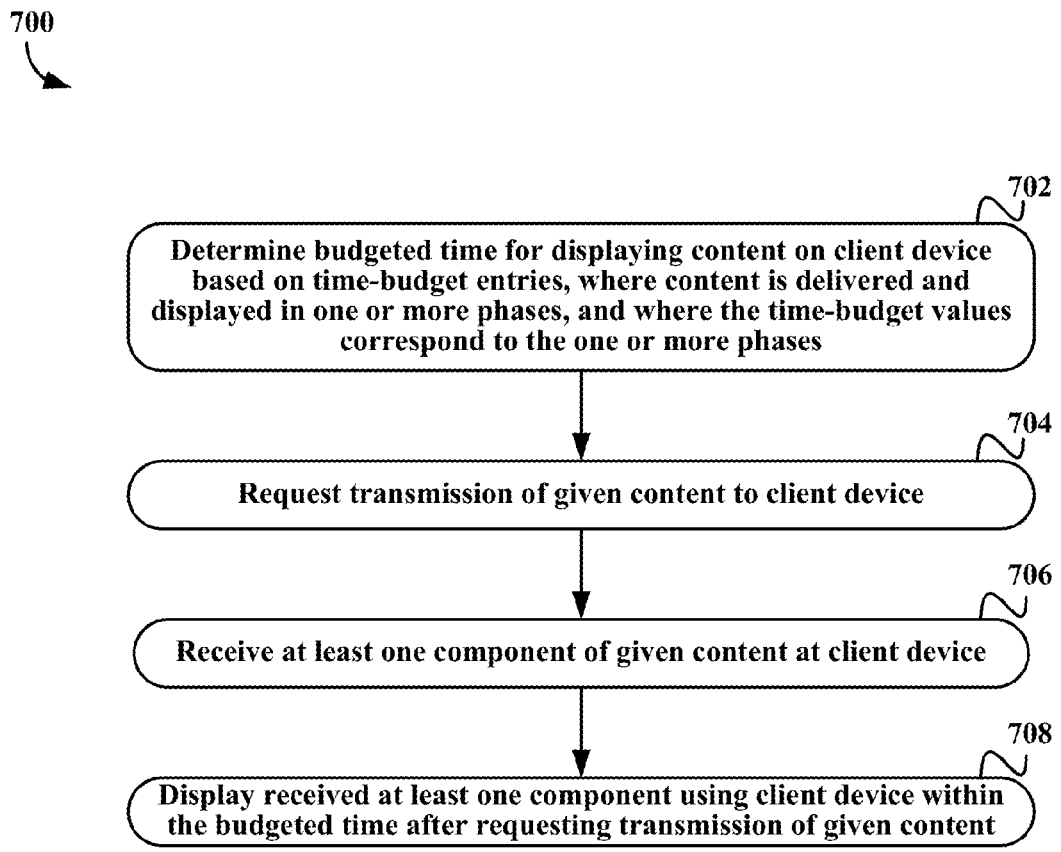
FIG. 7 is a flow chart of an example method in accordance with an example embodiment.

FIG. 7 is a flow chart of an example method 700 in accordance with an example embodiment. At block 702, a budgeted time is determined for displaying content on a client device, such as one or more of client devices 104a-104c. The budgeted time can be based on time-budget entries. The content can be delivered and displayed in one or more phases. The time-budget values can correspond to the one or more phases. A time budget can include the time-budget entries.

In some cases, the budgeted time can be explicitly determined. In other cases, the budgeted time can be implicitly determined. In some of these other cases, implicitly determining the budgeted time includes determining a request interval between at least two content requests and determining the budgeted time based on the request interval.

In still other cases, the budgeted time can be both explicitly and implicitly determined. Time budgets, budgeted times, and time-budget entries are discussed above in the context of at least FIGS. 3, 4, 5, 6B, and 6C.

At block 704, transmission of given content to the client device can be requested. Requesting transmission of content is discussed above in the context of FIGS. 1-6C.

At block 706, at least one component of the given content can be received at the client device. Receiving components of content are described above in the context of at least FIGS. 3, 4, 5, 6A, 6B, and 6C.

At block 708, the received at least one component of the given content can be displayed using the client device. The received at least one component can be displayed within the budgeted time after requesting the transmission of the given content. Receiving and displaying content within a budgeted time are discussed above in the context of at least FIGS. 3, 4, 5, 6B, and 6C.

In some cases, displaying the received at least one component can include adapting a service, such as but not limited to a content-request service, a content-response service, a content-download service, and/or content-display service. Examples of these services could include network-communication interface module(s) on client device(s), critical-path server(s), and/or content server(s), a browser or other content rendering software and/or hardware, and/or other types of services.

In other cases, device information can be determined. In these other cases, receiving at least one component of the given content at the client device can include receiving at least one component of the given content based on the device information. In some of these other cases, receiving at least one component of the given content based on the device information can include: receiving a first component of the at least one component of the given content based on the device information prior to a second component of the at least one component of the given content based on the device information, where the first component can be displayed in a display specified in the display information, and where the second component cannot be displayed in the display. Device information is discussed above in more detail in at least the context of FIGS. 5-6C.

In still other cases, connection information can be determined. In these still other cases, receiving at least one component of the given content at the client device can include receiving at least one component of the given content based on the connection information. In some of these still other cases, receiving the at least one component of the given content based on the connection information can include receiving a sub-sampled version of a first component of the at least one component of the given content based on the connection information. In other of these still other cases, receiving at least one component of the given content based on the connection information can include receiving a first component of the at least one component of the given content based on the connection information prior to a second component of at least one component of the given content based on the connection information, where the first component can be received within the budgeted time based on a total bandwidth of the connection information, and where the second component cannot be received within the budgeted time based on the total bandwidth. Connection information is discussed above in more detail in at least the context of FIGS. 5-6C.

CONCLUSION

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for displaying content in phases, the method comprising:
   determining a time budget for displaying content on a client device based on time-budget values, wherein the content is delivered and displayed in one or more phases, wherein the time-budget values correspond to the one or more phases, wherein the one or more phases comprise a content request phase, a content response phase, a content download phase, and a content display phase, and wherein the time budget begins with the content request phase;
   determining device information;
   requesting transmission of given content to the client device during the content request phase;
   receiving at least one component of the given content at the client device based on the device information prior to a second component of the at least one component of the given content based on the device information, wherein the first component can be displayed in a display specified in the display information, and wherein the second component cannot be displayed in the display; and
   displaying the received at least one component of the given content using the client device within the time budget.

2. The method of claim 1, wherein determining the time budget for displaying content on the client device comprises explicitly determining the time budget for displaying content on the client device.

3. The method of claim 1, wherein determining the time budget for displaying content on the client device comprises implicitly determining the time budget for displaying content on the client device.

4. The method of claim 3, wherein implicitly determining the time budget for displaying content on the client device comprises:
   determining a request interval between at least two content requests; and
   determining the time budget based on the request interval.

5. The method of claim 1, wherein displaying the received at least one component of the given content comprises:
   adapting a service to meet the time budget; and
   displaying the received at least one component using the adapted service.

6. The method of claim 1, further comprising:
   determining connection information; and
   wherein receiving the at least one component of the given content at the client device comprises receiving at least one component of the given content based on the connection information.

7. The method of claim 6, wherein receiving the at least one component of the given content based on the connection information comprises receiving a sub-sampled version of a first component of the at least one component of the given content based on the connection information.

8. The method of claim 6, wherein receiving the at least one component of the given content based on the connection information comprises receiving a first component of the at least one component of the given content based on the connection information prior to a second component of the at least one component of the given content based on the connection information, wherein the first component can be received within the time budget based on a total bandwidth of the connection information, and wherein the second component cannot be received within the time budget based on the total bandwidth.

9. A system for displaying content in phases, the system comprising:
one or more central processing units (CPUs) configured to:
determine a time budget for displaying content based on time-budget values, wherein the content is delivered and displayed in one or more phases, wherein the time-budget values correspond to the one or more phases, wherein the one or more phases comprise a content request phase, a content response phase, a content download phase, and a content display phase, and wherein the time budget begins with the content request phase;
determine device information;
request transmission of given content during the content request phase;
receive at least one component of the given content based on the device information prior to a second component of the at least one component of the given content based on the device information, wherein the first component can be displayed in a display specified in the display information, and wherein the second component cannot be displayed in the display; and
display the received at least one component of the given content within the time budget.

10. The system of claim 9, wherein the one or more CPUs configured to determine the time budget for displaying content are further configured to explicitly determine the time budget for displaying content.

11. The system of claim 9, wherein the one or more CPUs configured to determine the time budget for displaying content are further configured to implicitly determine the time budget for displaying content.

12. The system of claim 11, wherein the one or more CPUs configured to implicitly determine the time budget for displaying content on the client device are further configured to:
determine a request interval between at least two content requests; and
determine the time budget based on the request interval.

13. The system of claim 9, wherein the one or more CPUs configured to display the received at least one component of the given content are further configured to:
adapt a service to meet the time budget; and
display the received at least one component using the adapted service.

14. The system of claim 9, wherein the one or more CPUs are further configured to:
determine connection information; and
wherein the one or more processors configured to receive the at least one component of the given content are further configured to receive at least one component of the given content based on the connection information.

15. The system of claim 14, wherein the one or more CPUs configured to receive the at least one component of the given content based on the connection information are further configured to receive a sub-sampled version of a first component of the at least one component of the given content based on the connection information.

16. The system of claim 14, wherein the one or more CPUs configured to receive the at least one component of the given content based on the connection information are further configured to receive a first component of the at least one component of the given content based on the connection information prior to a second component of the at least one component of the given content based on the connection information, wherein the first component can be received within the time budget based on a total bandwidth of the connection information, and wherein the second component cannot be received within the time budget based on the total bandwidth.

17. An article of manufacture including a tangible non-transitory computer-readable storage medium having computer-readable instructions encoded thereon, the instructions comprising:
instructions for determining a time budget for displaying content based on time-budget values, wherein the content is delivered and displayed in one or more content-display phases, wherein the time-budget values correspond to the one or more phases, wherein the one or more phases comprise a content request phase, a content response phase, a content download phase, and a content display phase, and wherein the time budget begins with the content request phase;
instructions for determining device information;
instructions for requesting transmission of given content during the content request phase;
instructions for receiving at least one component of the given content based on the device information prior to a second component of the at least one component of the given content based on the device information, wherein the first component can be displayed in a display specified in the display information, and wherein the second component cannot be displayed in the display; and
instructions for displaying the received at least one component of the given content within the time budget.

18. The article of manufacture of claim 17, wherein the instructions for determining the time budget for displaying content comprise instructions for explicitly determining the time budget for displaying content.

19. The article of manufacture of claim 17, wherein the instructions for determining the time budget for displaying content comprise instructions for implicitly determining the time budget for displaying content.

20. The article of manufacture of claim 19, wherein the instructions for implicitly determining the time budget for displaying content comprise:
instructions for determining a request interval between at least two content requests; and
instructions for determining the time budget based on the request interval.

21. The article of manufacture of claim 17, wherein the instructions for displaying the received at least one component of the given content comprise:
instructions for adapting a service to meet the time budget; and
instructions for displaying the received at least one component using the adapted service.

22. The article of manufacture of claim 17, further comprising:
instructions for determining connection information; and
wherein the instructions for receiving the at least one component of the given content comprise instructions for receiving at least one component of the given content based on the connection information.

23. The article of manufacture of claim 22, wherein the instructions for receiving the at least one component of the given content based on the connection information comprise instructions for receiving a sub-sampled version of a first component of the at least one component of the given content based on the connection information.

24. The article of manufacture of claim 22, wherein the instructions for receiving the at least one component of the given content based on the connection information comprise instructions for receiving a first component of the at least one component of the given content based on the connection information prior to a second component of the at least one component of the given content based on the connection information, wherein the first component can be received within the time budget based on a total bandwidth of the connection information, and wherein the second component cannot be received within the time budget based on the total bandwidth.

25. A system for displaying content in phases, the system comprising:

means for determining a time budget for displaying content based on time-budget values, wherein the content is delivered and displayed in one or more phases, and wherein the time-budget values correspond to the one or more phases, wherein the one or more phases comprise a content request phase, a content response phase, a content download phase, and a content display phase, and wherein the time budget begins with the content request phase;

means for determining device information;

means for requesting transmission of given content during the content request phase;

means for receiving at least one component of the given content based on the device information prior to a second component of the at least one component of the given content based on the device information, wherein the first component can be displayed in a display specified in the display information, and wherein the second component cannot be displayed in the display; and means for displaying the received at least one component of the given content within the time budget.

\* \* \* \* \*